United States Patent [19]

Baureis et al.

[11] Patent Number: 4,836,695
[45] Date of Patent: Jun. 6, 1989

[54] COMPOSITE SLIDING SURFACE BEARING

[75] Inventors: Hans-Paul Baureis, Dielheim-Horrenberg; Wolfgang Bickle, Reilingen; Wilhelm Lankreijer, Bruchsal, all of Fed. Rep. of Germany

[73] Assignee: Kolbenschmidt Aktiengesellschaft, Neckarsulm, Fed. Rep. of Germany

[21] Appl. No.: 227,860

[22] Filed: Aug. 3, 1988

[30] Foreign Application Priority Data

Aug. 18, 1987 [DE] Fed. Rep. of Germany ....... 3727468

[51] Int. Cl.$^4$ .............................................. F16C 33/04
[52] U.S. Cl. ................................... 384/276; 384/286; 384/288; 384/294; 384/912; 384/913
[58] Field of Search ............... 384/276, 294, 286, 912, 384/913, 288

[56] References Cited

U.S. PATENT DOCUMENTS

| 2,547,465 | 4/1951 | Heintz et al. | 384/288 |
| 3,641,990 | 2/1972 | Kinnersly | 384/288 |
| 3,891,287 | 6/1975 | Vogt | 384/288 |
| 4,707,149 | 11/1987 | Hahle | 384/276 |

Primary Examiner—Lenard A. Footland
Attorney, Agent, or Firm—Strung, Horn, Kramer & Woods

[57] ABSTRACT

A composite sliding surface bearing consisting of a backing layer of steel, a bearing alloy layer which consists of aluminum and has been applied to said backing layer, and a sliding surface layer which consists of zinc phosphate and has been deposited on said bearing alloy layer. The backing layer of steel is provided on its outside surface in a thickness between 0.5 and 5 μm with a metallic protective layer in order to ensure a firm retention in the bearing housing.

1 Claim, 1 Drawing Sheet

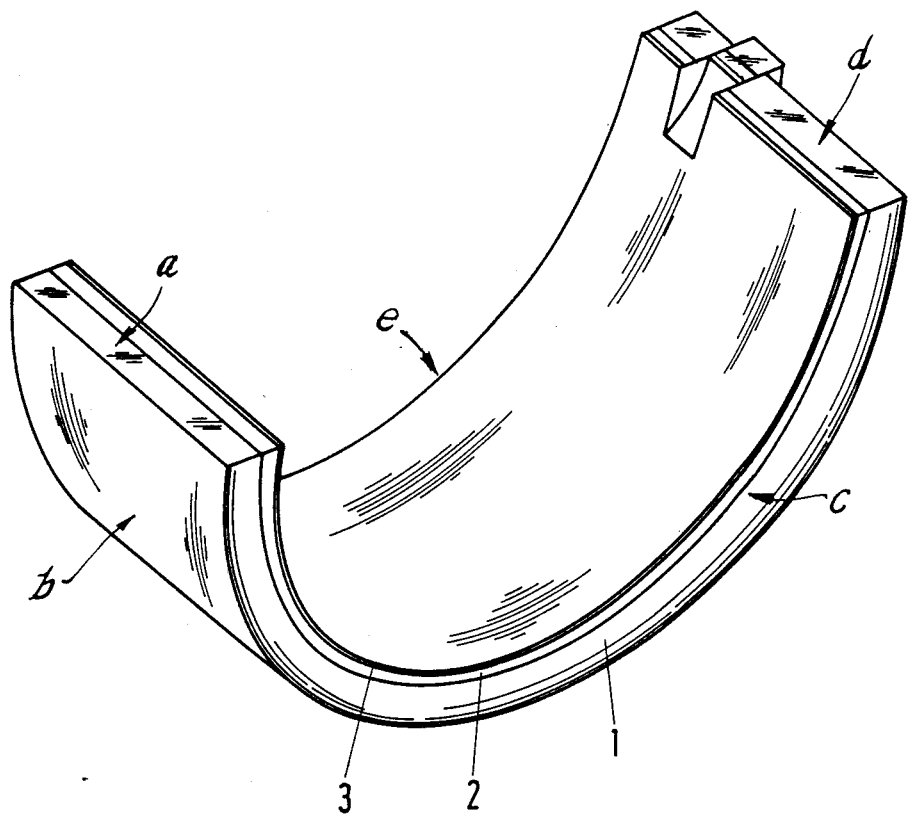

COMPOSITE SLIDING SURFACE BEARING

BACKGROUND OF THE INVENTION

This invention relates to a composite sliding surface bearing for use in highly loaded internal combustion engines, particularly supercharged diesel engines, or associated power trains, consisting of a backing layer of steel, a bearing alloy layer, which has been applied to said backing layer and consists of an aluminum alloy of the type AlSi12CuMgNi, AlSn6Cu, AlZn5SiCuPb or preferably AlZn4.5SiCuPb, and a sliding surface layer, which consists of zinc phosphate and has been deposited in a thickness between 2 and 8 μm on the aluminum bearing alloy layer.

In that composite sliding surface bearing which has been described in EP 0 No. 059 273, the sliding surface layer consisting of zinc phosphate owing to its very high adaptability can take up local load peaks so as to promote a uniform distribution of the load on the structure of the sliding surface bearing. This will be of special advantage where the hard and wear-resisting aluminum bearing alloys are used because geometric inaccuracies, such as misalignments, can never entirely be avoided in series production. Because the sliding surface layer consisting of zinc phosphate has a lower resistance to wear than the aluminum bearing alloy layer, the running in of the bearing will be promoted.

To form the sliding surface layer consisting of zinc phosphate, the composite sliding surface bearing consisting of the backing layer of steel and the aluminum bearing alloy layer is cleaned and the sliding surface layer consisting of zinc phosphate is applied in a warm solution of primary zinc phosphate in dilute phosphoric acid at a temperature between 60° and 80° C., followed by a rinsing with water at a temperature between 40° and 60° C. But it has been found that the zinc phosphate layer which is disposed outside the sliding surface of the composite sliding surface bearing, specifically on the rear surface of the backing layer of steel and on the peripheral edges and optionally on the joint-forming surfaces of the bearing will adversely affect the firm retention of the composite sliding surface bearing during the operation of the engine. This is particularly due to the fact that the zinc phosphate layer provided on the rear surface of the backing layer of steel has a surface roughness $R_z$ of about 40 μm and under load may give rise to micromotions resulting in a higher wear of the composite sliding surface bearing.

It is an object of the present invention to provide a composite sliding surface bearing which is of the kind described first hereinbefore and which will be firmly retained in the bearing housing under all operating conditions of the internal combustion engine.

SUMMARY OF THE INVENTION

That object is accomplished in that those surfaces of the bearing which are disposed outside the sliding surface, particularly the rear surface of the backing layer of steel, are provided in a thickness between 0.5 and 5 μm with a protective layer of tin, cadmium, cobalt, copper zirconium, lead, silver, titanium, tungsten or chromium. That protective layer will prevent a formation of a zinc phosphate layer outside the sliding surface of the composite sliding surface bearing and will improve the adaptation of the composite sliding surface bearing to the bearing housing.

When the composite sliding surface bearing has been cleaned in the conventional manner, the protective layer is formed in that the protective layer is first applied by chemical deposition or electrodeposition to all surfaces of the bearing and is subsequently removed from the sliding surface region and the bearing is subsequently contacted with a zinc phosphate bath which is at a temperature between 60° and 80° C. so that the zinc phosphate layer is deposited on the sliding surface, and the bearing is subsequently rinsed in a water bath at a temperature between 40° and 60° C. The zinc phosphate layer can be deposited only on the sliding surface region because all other surfaces are provided with the protective layer, on which a zinc phosphate layer cannot be formed.

BRIEF DESCRIPTION OF THE DRAWING

The FIGURE is a perspective view of a shell of a sliding surface bearing according to the invention.

DETAILED DESCRIPTION OF THE INVENTION

In accordance with the FIGURE, the shell of the sliding surface bearing that has been coated in accordance with the invention consists of a backing layer 1 of steel and a bearing alloy layer 2 which has been applied to the backing layer 1 and consists of an aluminum layer of the type AlZn4.5SiCuPb. To said bearing alloy layer, a zinc phosphate layer 3 has been applied, which ensures a high adaptability as the bearing is run in. A protective layer of tin in a thickness of 1 to 3 μm is provided on the rear surface b of the backing shell 1 and on the peripheral edges c and e and the joint-forming surfaces a and d. That protective layer ensures a firm retention of the shell of the sliding surface bearing under all operating conditions.

What is claimed is:

1. A composite sliding surface bearing for use in highly loaded internal combustion engine or associated power trains, comprising: a backing layer of steel, a bearing alloy layer, which has been applied to said backing layer and is composed of an aluminum alloy of the type AlSi12CuMgNi, AlSn6Cu, AlZn5SiCuPb or AlZn4.5SiCuPb, and a sliding surface layer, which is composed of zinc phosphate deposited in a thickness of between 2 and 8 μm on the aluminum bearing alloy layer, wherein those surfaces of the bearing which is disposed outside the sliding surface, including the rear surface of the backing layer of steel, are provided in a thickness between 0.5 and 5 μm with a protective layer of tin, cadmium, cobalt, copper zirconium, lead, silver, titanium, tungsten or chromium.

* * * * *